US010402115B2

(12) United States Patent
Schreter

(10) Patent No.: US 10,402,115 B2
(45) Date of Patent: Sep. 3, 2019

(54) STATE MACHINE ABSTRACTION FOR LOG-BASED CONSENSUS PROTOCOLS

(71) Applicant: SAP SE, Walldorf (DE)

(72) Inventor: Ivan Schreter, Malsch (DE)

(73) Assignee: SAP, SE, Walldorf (DE)

( * ) Notice: Subject to any disclaimer, the term of this patent is extended or adjusted under 35 U.S.C. 154(b) by 240 days.

(21) Appl. No.: 15/363,738

(22) Filed: Nov. 29, 2016

(65) Prior Publication Data

US 2018/0150230 A1 May 31, 2018

(51) Int. Cl.
*G06F 11/00* (2006.01)
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
CPC ......... G06F 3/065; G06F 3/067; G06F 3/0619
USPC .......................................................... 714/19
See application file for complete search history.

(56) References Cited

U.S. PATENT DOCUMENTS

| 2009/0150566 A1* | 6/2009 | Malkhi | H04L 67/34 709/242 |
| 2014/0271463 A1* | 9/2014 | Del Campo Milan | C07K 16/28 424/1.49 |
| 2015/0172412 A1* | 6/2015 | Escriva | G06F 9/466 709/202 |

* cited by examiner

*Primary Examiner* — Yair Leibovich
(74) *Attorney, Agent, or Firm* — Mintz Levin Cohn Ferris Glovsky and Popeo, P.C.

(57) ABSTRACT

A generic state machine concept can be used to decouple specific state machine functionality from any specific consensus protocol. A generic state machine can prepare a local log record and generate a local log index in response to a data update received at a computing node of a plurality of computing nodes in a distributed data storage application. The generic state machine can pass replication information to one or more other computing nodes in the plurality of computing nodes in accordance with the consensus protocol and can mutate a state of the generic state machine upon the plurality of computing nodes achieving a quorum.

19 Claims, 8 Drawing Sheets append(request, xdata, do_flush, [out] log_index) : future, process(start_log_index, callback), read(log_index) : future<request, xdata>.

initialize(persistence, snapshot) : future - load state machine from a snapshot,
read(request) : future<reply> - process read request and reply to it,
prepare(request) : future<hint, xdata> - prepare mutation (before logging),
mutate(request, hint, xdata) : future<reply> - execute mutation (after logging),
rollback(request, hint) - roll back prepare (if logging fails),
promote_to_leader() - set this state machine as leader in consensus protocol,
demote_to_follower() - set this state machine as follower in consensus protocol,
do_snapshot([out] snapshot) - snapshot the state machine state into persistent storage.

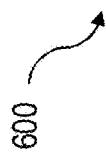

FIG. 6

STATE MACHINE ABSTRACTION FOR LOG-BASED CONSENSUS PROTOCOLS

TECHNICAL FIELD

The subject matter described herein relates to data storage, and in particular to features that permit use of an abstracted state machine with various log-based consensus protocols.

BACKGROUND

Consensus protocols ensure that data replicated across several nodes of a cluster of nodes remain in a consistent state and are widely used in distributed computing systems to achieve failure tolerance in clusters of computers. Consensus protocols can be used in a variety of systems, such as for example key/value stores, document stores, ensure that data distributed or replicated across multiple nodes of a cluster of nodes remain in a consistent state and are widely used in distributed computing systems to achieve failure tolerance in clusters of computers.

In general, each computing node in the cluster runs its own copy of a state machine for the cluster. Consensus involves multiple nodes (e.g. servers, computing systems, data stores, etc.) being in agreement on data values. Once a consensus is reached, that decision is final. Each node in a cluster can include a computing system with one or more programmable processors implementing a state machine and a log. Consensus is typically reached when a quorum (e.g. a majority, a plurality, or some other definition etc.) of the nodes in the cluster decides to accept the new state of the system (e.g., adding new data to a database table, setting a value for a key in key value stores, accepting a message in messaging systems, etc.). The state of the state machine presented by the cluster is based on the consensus such that clients interacting with the cluster perceive the nodes in the cluster as a single state machine having a consistent state. A consensus algorithm can ensure that if any of the state machines in a cluster applies a particular command at a particular point in a series of commands, none of the other state machines in the cluster will apply a different command at that same point in the series of commands. Well-known examples of consensus protocols include Paxos and RAFT.

SUMMARY

Aspects of the current subject matter can provide the ability to decouple state machine functionality from consensus protocol handling.

In one aspect, a method includes preparing a local log record and generating a local log index at a generic state machine executing on a computing node of a plurality of computing nodes. The preparing and generating occur in response to a data update received at the computing node. The generic state machine includes a decoupling of state handling from handling of a consensus protocol implemented by the plurality of nodes. The method further includes passing replication information to one or more other computing nodes in the plurality of computing nodes in accordance with the consensus protocol, mutating a state of the generic state machine upon the plurality of computing nodes achieving a quorum, and sending a reply to the data update.

In some variations one or more of the following features can optionally be included in any feasible combination. The data update is received from a client machine and the reply to the data update is sent to the client machine. The data request can be rolled back to a previous state of the generic state machine if the log preparing and log index generation are not successful. The generic state machine can prepare a request and any necessary external data and/or hints. The preparing can include allocating space for storage of key value pairs and/or other data. The log record can be written at the local log index when the preparing and generating are successful.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a data storage application, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 shows an example of pseudocode illustrating implementation features of interaction of a generic state machine consistent with implementations of the current subject matter with a persistence component;

When practical, similar reference numbers denote similar structures, features, or elements.

DETAILED DESCRIPTION

Currently available implementations of distributed and replicated systems based on consensus protocols (e.g. key/value stores, document stores, message queue systems, logging systems, etc.) are generally single-purpose, where the consensus protocol/replication is tightly coupled with the state machine representing the actual algorithm handling the state machine transitions of the nodes and the cluster as a whole. In other words, such systems are generally built as single-purpose systems with logic for distributed data replication and synchronization. As such, it can be difficult to build a new distributed system for a new type of state machine (e.g., to create a distributed time-series or graph data store) and it can also be difficult to replace a consensus protocol used for a given data store with a different consensus protocol, (e.g., to achieve better performance, high availability properties, or the like).

In certain aspects, the current subject matter can include a decoupling of distribution operations of a distributed data management system (e.g. the consensus protocol) from implementation of the state machine itself such that the distribution functionality can be used with any state machine. Similarly, aspects of the current subject matter can allow use of the decoupled state machine with various consensus protocols.

The current subject matter generally relates to consensus protocols, which build a log of operations on a state machine. The log of operations is generally synchronized across a set of nodes in the cluster using a consensus protocol. It should be understood that the features described herein are not limited to use with any given consensus protocol. However, for illustrative purposes, various aspects are described with respect to the RAFT consensus protocol. Typically in a consensus protocol, one node is elected as a leader node (or "leader"), while the remaining nodes are follower nodes (or "followers"). All of the nodes, including the leader can be referred to as replicas. A consensus protocol decides which log entries are "committed," in other words, accepted by quorum of nodes.

Figure 1:
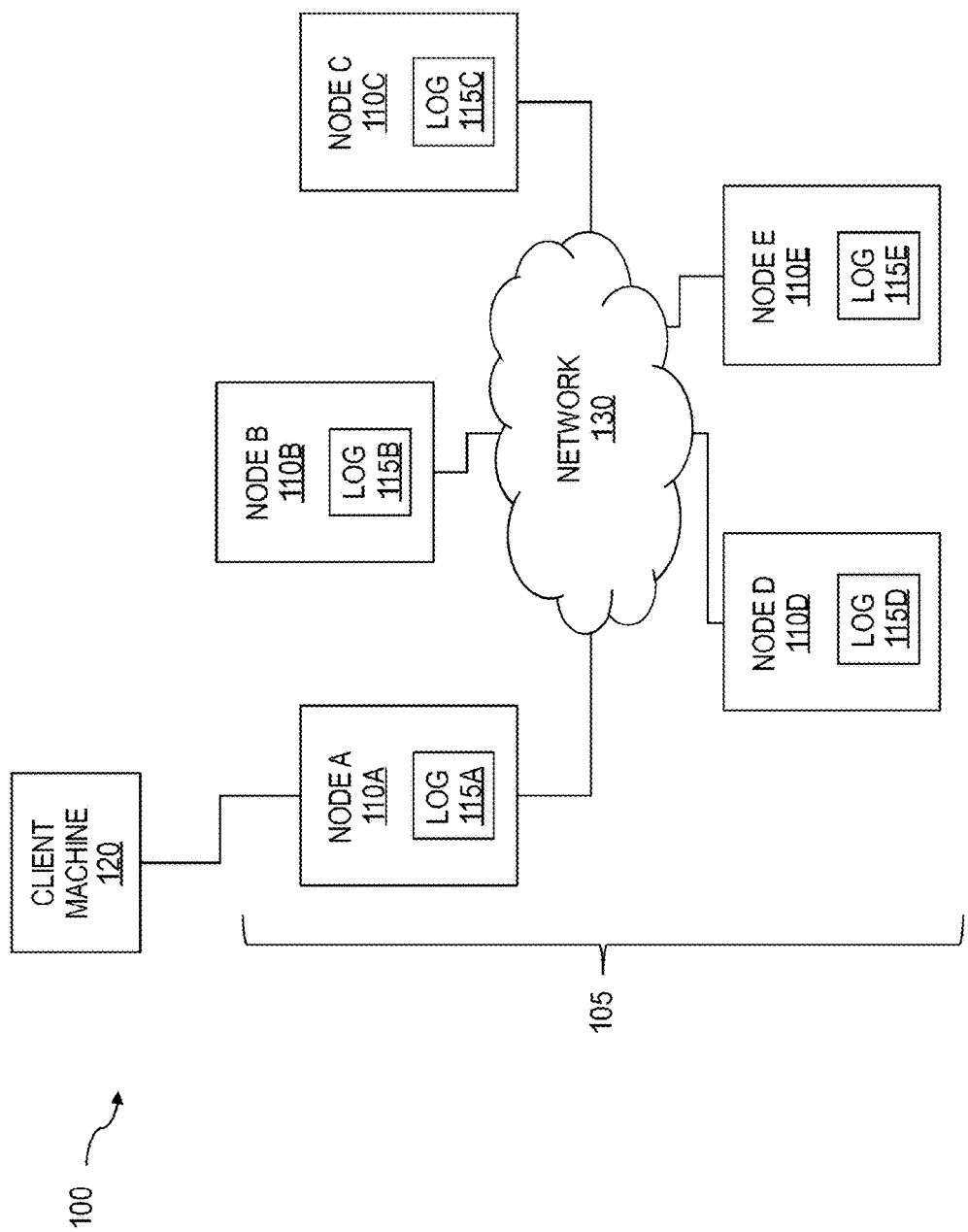
FIG. 1 shows a diagram of a system architecture including features of an example in which a consensus protocol is used in a cluster 105 of computing systems.

FIG. 1 shows a diagram of a system architecture 100 in which a consensus protocol is used in a cluster 105 of computing systems (e.g. nodes) to ensure that the nodes of the cluster (each of which implements a state machine of a data storage application) are kept in a consistent state based on a consensus among the nodes. The cluster 105 shown in FIG. 1 includes a first node 110A, a second node 110B, a third node 110C, a fourth node 110D, and a fifth node 110E. Each node 110A, 110B, 110C, 110D, 110E includes a respective log 115A, 115B, 115C, 115D, 115E. The cluster 105 can interact with one or more client machine(s) 120, for example over a network communication pathway 130 to receive and respond to requests, such as for example nodes exchange messages regarding new data values, updates to data values, deletion of values, etc. (which are generally referred to herein as data updates).

A data update in an example (e.g. as illustrated in the system architecture 200 shown in FIG. 2) in which one or more client machines 120 communicates with a data storage application 204 executing on a single node (e.g. computing system 202) does not involve any consensus issues—the data value being updated by interaction between a client machine 120 and the data storage application 204 executing on the single node 110 is whatever it is per the state of the single node. In a distributed approach such as that illustrated in FIG. 1, however, all of the nodes 110A, 110B, 110C, 110D, 110E may not always be in perfect agreement regarding the state of the data value being updated. A consensus protocol such as those discussed above is typically used in distributed data storage applications.

Figure 2:
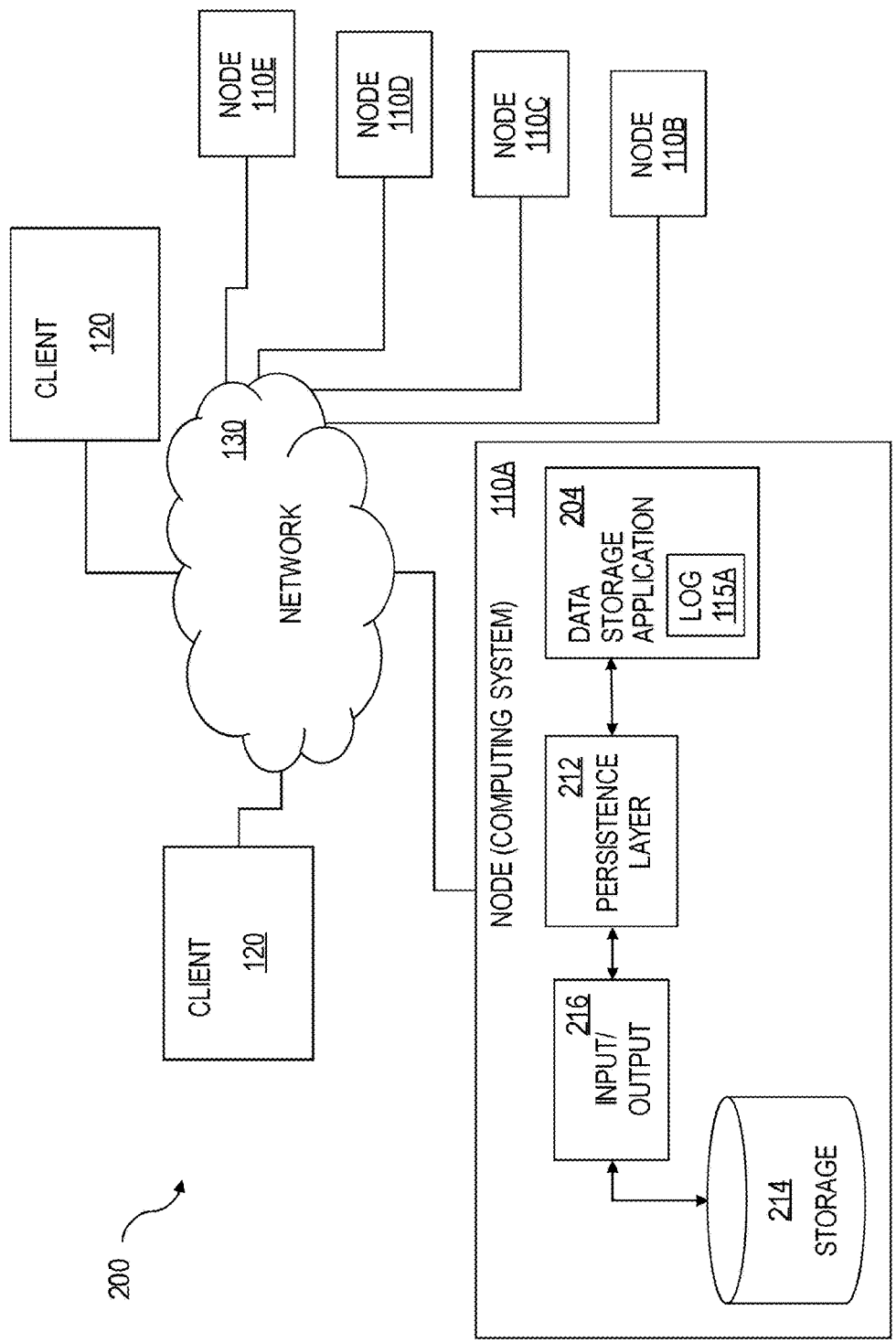
FIG. 2 shows a diagram of a system architecture including features of an example in which a client machine communicates with a data storage application executing on a single node.

Further with reference to FIG. 2, the computing system 110A is representative of any of the nodes 110A, 110B, 110C, 110D, 110E shown in FIG. 1. The computing system 110A can include one or more programmable processors that can be collocated, linked over one or more networks, etc., and can execute one or more modules, software components, or the like of the data storage application 204. The data storage application 204 can include one or more of a database, an enterprise resource program, a distributed storage system (e.g. NetApp Filer available from NetApp of Sunnyvale, Calif.), or the like. In some examples, the data storage application can support one or more multi-tenancy features, data security/encryption, cloud infrastructure features, and/or other enterprise-level capabilities.

The one or more modules, software components, or the like can be accessible to local users of the computing system 110A as well as to remote users accessing the computing system 110A from one or more client machines 120 over a network connection 130. One or more user interface screens produced by the one or more first modules can be displayed to a user, either via a local display or via a display associated with one of the client machines 120. Data units of the data storage application 204 can be transiently stored in a persistence layer 212 (e.g. a page buffer or other type of temporary persistency layer), which can write the data, in the form of storage pages, to one or more secondary (e.g. persistent) storages 214, for example via an input/output (I/O) subsystem 216. The one or more secondary storages 214 can include one or more physical storage media or devices (e.g. hard disk drives, persistent flash memory, random access memory, optical media, magnetic media, and the like) configured for writing data for longer term storage. It should be noted that the secondary storage 214 and the input/output subsystem 216 can be external to the computing system 110A despite their being shown as included within the computing system 110A in FIG. 2.

Data retained at the secondary storage 214 of a node 110A can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

While it will be understood that the current subject matter may operate with other consensus protocols, various features are described herein in relation to the RAFT protocol.

In establishing consensus between multiple nodes in a cluster (e.g. a cluster 100 such as that shown in FIG. 1) the RAFT protocol general involves transmission of a "match index" from follower (also referred to in some instances as "replica") nodes 110B, 110C, 110D, 110E to a leader node 110A to inform the leader node 110A what is the last common log entry index in the local log 115B, 115C, 115D, 115E of each follower node 110B, 110C, 110D, 110E and the log 115A of the leader node 110A. The RAFT protocol further includes transmission of a "commit index" from the current leader 110A to all of the follower nodes 110B, 110C, 110D, 110E to inform the follower nodes what is the globally agreed index of the last fully-replicated log entry.

Further to the above summary, the RAFT protocol classifies each node in a cluster 100 as being in one of a follower state, a candidate state, or a leader state. All nodes in a cluster other than the leader node have the follower state. However, when a current follower node fails to hear from a leader within some period of time, the follower can become a candidate and request votes from other nodes in the cluster as part of a leader election process. The candidate node becomes the leader 110A if it receives a majority of the votes from the nodes in the cluster 100. In an existing approach, data updates go through the cluster's leader 110A, and each such data update is added as an initially uncommitted entry in the log 115A of the leader node 110A. In other words, when the cluster 100 receives a data update, the data value being updated is generally not immediately updated at the leader node 110A. Committing the data update requires that the leader node 110A replicates the data update to the other nodes in the cluster 100 and then waits until a majority of the nodes confirm that they have written the data update. Upon receiving this confirmation from the majority, the leader node 110A then notifies the follower nodes 110B, 110C, 110D, 110E that the data update is committed.

Figure 3:
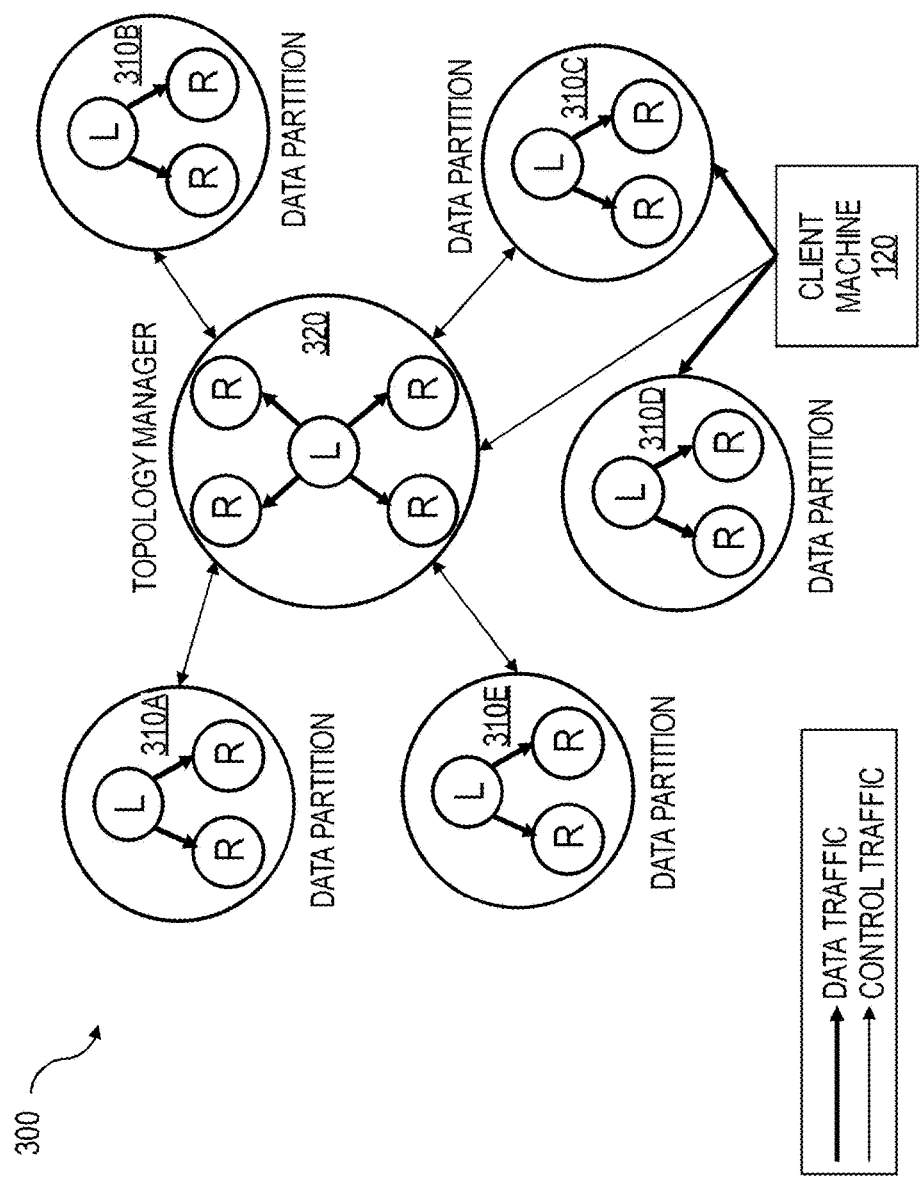
FIG. 3 shows a diagram of a distributed data system architecture including features of an example in which data are partitioned among multiple data partitions.

FIG. 3 shows a diagram of a distributed data system architecture 300 in which data are partitioned among multiple (e.g. two or more) data partitions 310A, 310B, 310C, 310D, 310E, each of which includes a subset (e.g. as designated by key value ranges) of the data managed by the data management architecture. Each data partition can optionally be replicated across a plurality of computing nodes, and can therefor execute or otherwise implement a local consensus protocol to enforce data replication across those computing nodes.

A topology manager 320 keeps track of the existing partitions (e.g. data partitions 310A, 310B, 310C, 310D, 310E as in FIG. 3) of a distributed system and can perform functions such as keeping track of the existing data partitions and computing nodes upon which they are hosted, detecting communication and node failures, load balancing (replicas of) data partitions over the available nodes. The topology manager can manage itself just like any other data partition in the system. Alternatively, other approaches, such as for example the use of a gossip protocol or the like, are also within the scope of the current subject matter.

A client 120 can connect directly to any of the data partitions 310A, 310B, 310C, 310D, 310E, and can query the topology manager 320 for partition information.

Figure 4:
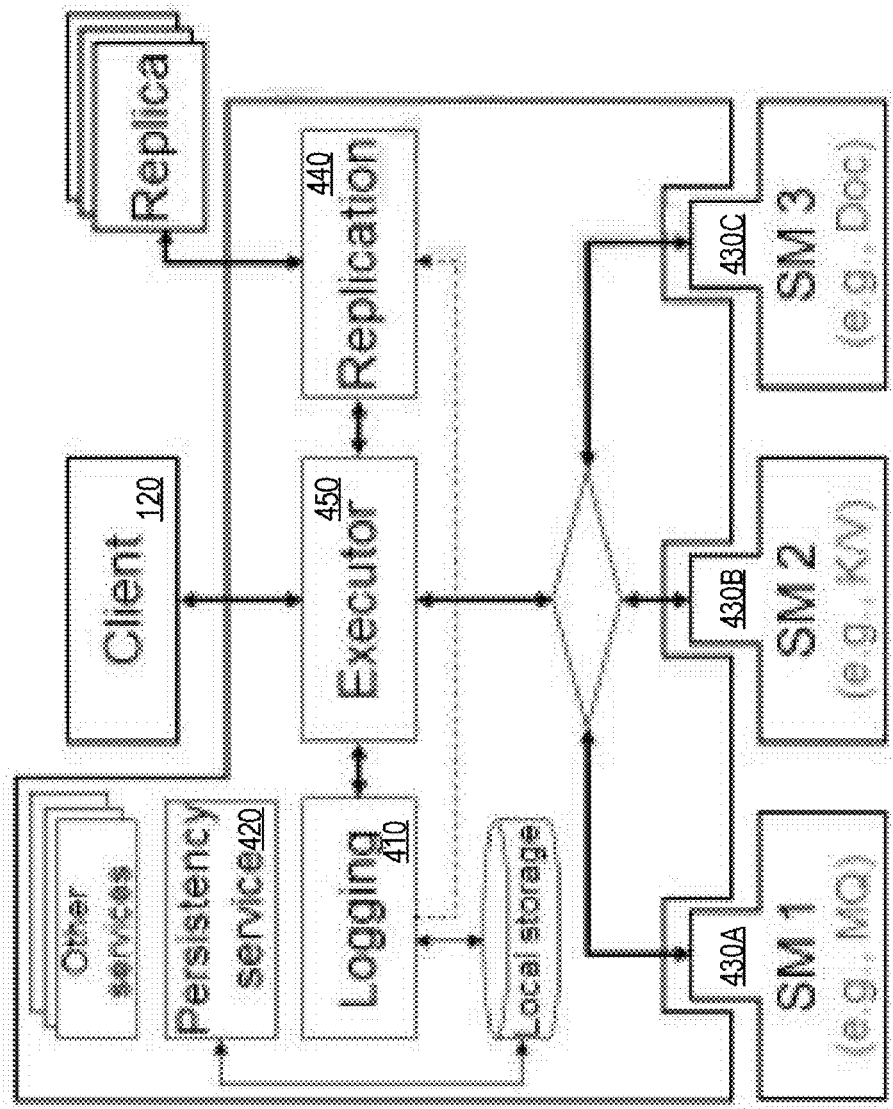
FIG. 4 shows a diagram of an example of a generic state machine framework consistent with implementations of the current subject matter.

FIG. 4 shows a diagram of a generic state machine framework 400 consistent with implementations of the current subject matter. The generic state machine framework 400 can include a logging interface component 410 (e.g. to store a log of mutate requests), a data persistence component 420 (e.g. a "persistency service" to store snapshots and possibly also logs), a state machine component 430A, 430B, 430C for each of one or more services (e.g. state machine types, such as for example a key/value store, a message broker, etc.) that can be used with the system, and a consensus/replication protocol component 440. All of these components can have multiple implementations and can be freely combined using simple interfaces.

Figure 5:
FIG. 5 shows an example of pseudocode illustrating implementation features of an example logging interface of a generic state machine consistent with implementations of the current subject matter.

A logging interface (e.g. of the log or logging component 410) of a generic state machine framework 400 can in one example implementation be generalized according to the pseudocode 500 shown in FIG. 5. The "append" method shown in FIG. 5 can include serializing into the logging component (also referred to as the log) 410 the request and any extra data (e.g. "xdata" as in the pseudocode of FIG. 5), which may be produced as needed (e.g if needed) by the generic state machine component.

The "process( )" method listed in the pseudocode shown in FIG. 5 processes the log starting from a given log index and calls a callback (which can for example replay the log entry on recovery, send the log entry via replication protocol, etc.). Log processing terminates when the entire log is consumed or if the callback returns with the request to terminate log processing.

The "read( )" method reads the log record at a given index and gives it back to the caller (e.g., to catch up on replication of consensus protocol followers falling too much behind).

The data persistence component 420 can be generalized to handling snapshots for the state machine and logs. The current subject matter is not limited to any specific interface via which this is accomplished. In general, a data persistence interface consistent with implementations of the current subject matter is capable of storing a snapshot of the state machine concurrently with a log index and also capable of reading a snapshot of the state machine at recovery time.

A state machine component consistent with implementations of the current subject matter can be plugged into an executor/consensus protocol using a state machine API. The example generic state machine framework 400 of FIG. 4 shows three such generic state machines 430A, 430B, 430C. This functionality of the generic state machine framework 400 can facilitate easy implementation of new state machine types to correctly fulfill a request upon a replay of the log 410 locally or on a remote replica, as discussed in more detail below. The method also returns an index of the generated log entry immediately and a future which will become ready once the logged data is actually persistent, for example as can be implemented in a future/promise approach. A future/promise approach includes a request to start an asynchronous operation (such as I/O or also more complex operation like writing to log, replicating data and the like) returning an object called "future," which links to a promise to deliver result of the operation sometime in the future. Futures are initially not ready (not resolved). When the associated promise is fulfilled (e.g., I/O finished), then the linked "promise" object is assigned a value and this value makes a "future" object ready. At this point, whatever action was associated to be executed after the future becomes ready will be executed. This can be done for instance by associating a lambda function with a future or (e.g. in the C++11 standard) by waiting on the future sometime later. In general, an action is started which executes asynchronously while something else is completed in the meantime, and ultimately the "future" will be made ready and computation relying on the asynchronous result can continue.

Various generic state machines consistent with implementations of the current subject matter may use different persistence implementations. Alternatively or in addition, a persistence implementation can be integrated within a generic state machine. For example, a local SQL database can be used as a state machine and persistence implementation and be replicated on several nodes. Simpler state machines, such as for example a key/value (K/V) store, are also within the scope of the current subject matter. In still other optional variations, a logging implementation can use or include persistence services or have its own persistence.

Consistent with implementations of the current subject matter, the generic state machine framework 400 can be generalized to methods such as those listed in the pseudocode 600 shown in FIG. 6 with regard to interaction with the persistence component 420. One or more generic state machines 430A, 430B, 430C can act as "plugins" to the generic state machine framework 400 and make use of a generalized interface via which the generic state machine framework can interact with them.

Logging, replication and state machine operations of the generic state machine 400 can be driven from an executor 450. In general, the executor 450 processes client requests and client replies via communication with one ore more client machines 120. For example, the executor 450 can provide an end-user API that can operate as follows: execute (request): future<reply> to the system. The executor 450 can be implemented as necessary to enforce a consensus protocol (for example, the RAFT protocol in a simple case), which logs data locally, replicates the logged data to other replicas of the state machine and calls a mutator of the state machine. Additional features, such as for example exactly-once request handling in the presence of failures, flexible durability handling, etc. can be also realized in a generic manner on the executor, independent of state machine implementation. It will be understood that specifics of an actual implementation of a consensus protocol are not relevant to the scope of the current disclosure. Any consensus protocol may be used provided it is compatible with the features of other system components described herein.

In general the executor can provide a minimalistic API for implementing of processes or functions including one or more of initializing snapshots; reading inbound requests and providing outbound replies; preparing the state machine to process inbound requests by producing xdata and/or hints; mutating the state machine state by inbound requests, xdata and/or hints computed during a prepare stage and producing outbound replies; rolling back failed inbound requests (optionally based on hints computed during the prepare stage); and promoting nodes to be leader nodes and/or demoting leader nodes to follower nodes. Xdata can include opaque data to persist with a request in the log and a hint can be a local pointer to that opaque data.

Each state machine may need to store some additional data within the log request. For instance, a database table might store a technical key of the record being created and the like. This information is then made available to a "mutate( )" method as well as to any replica, which needs to execute exactly the same operation with exactly the same semantic as on the leader. Since the framework doesn't know the structure of this data, it can merely store it as an opaque byte sequence (e.g. as opaque data). This approach is discussed in further detail below.

Hints are generally used for transient purposes. For instance, a key/value store may use a binary tree to represent a key/value data set. A "prepare( )" method already needs to descend the tree to find the proper key/value pair. In order to prevent double work, it can return a hint (e.g., equal to the address of the tree node in memory), which will be used by the "mutate( )" method to quickly locate the same record without descending the tree again.

For leader-based consensus protocols (such as for example RAFT or the like), only the generic state machine 400 on the leader node accepts read and prepare requests, while generic state machines of a follower node only accepts mutate requests, generally without hints, to apply a change to the follower node generic state machine. These mutate requests are generally prepared at the leader node generic state machine 400. Methods such as "promote_to_leader( )" and "demote_to_follower( )" can be used to control the generic state machine mode of a given node in the cluster.

Read requests on a generic state machine 400 consistent with implementations of the current subject matter can be executed directly. For example, updates can be executed in two steps (prepare and mutate), since this separation may be necessary to properly interact with logging and replication of the consensus protocol. Consistent with some implementations, when an update request arrives, it is first prepared on the state machine, which changes the state in such a way that the state machine guarantees a following mutate( ) call for the same update request will succeed. To facilitate that, the state machine can produce extra data (which, as noted above, can be referred to as xdata) to be logged and passed on to the follower (to ensure exactly same operation result) and a hint, which is used locally to prevent potentially unnecessary lookups when doing actual update in mutate( ) call (e.g., pointer to data structure of a particular key to prevent descending key tree again in case of K/V store). In the event that preparation of the state machine fails, the error is sent to the client and processing of the request finishes.

Figure 7:
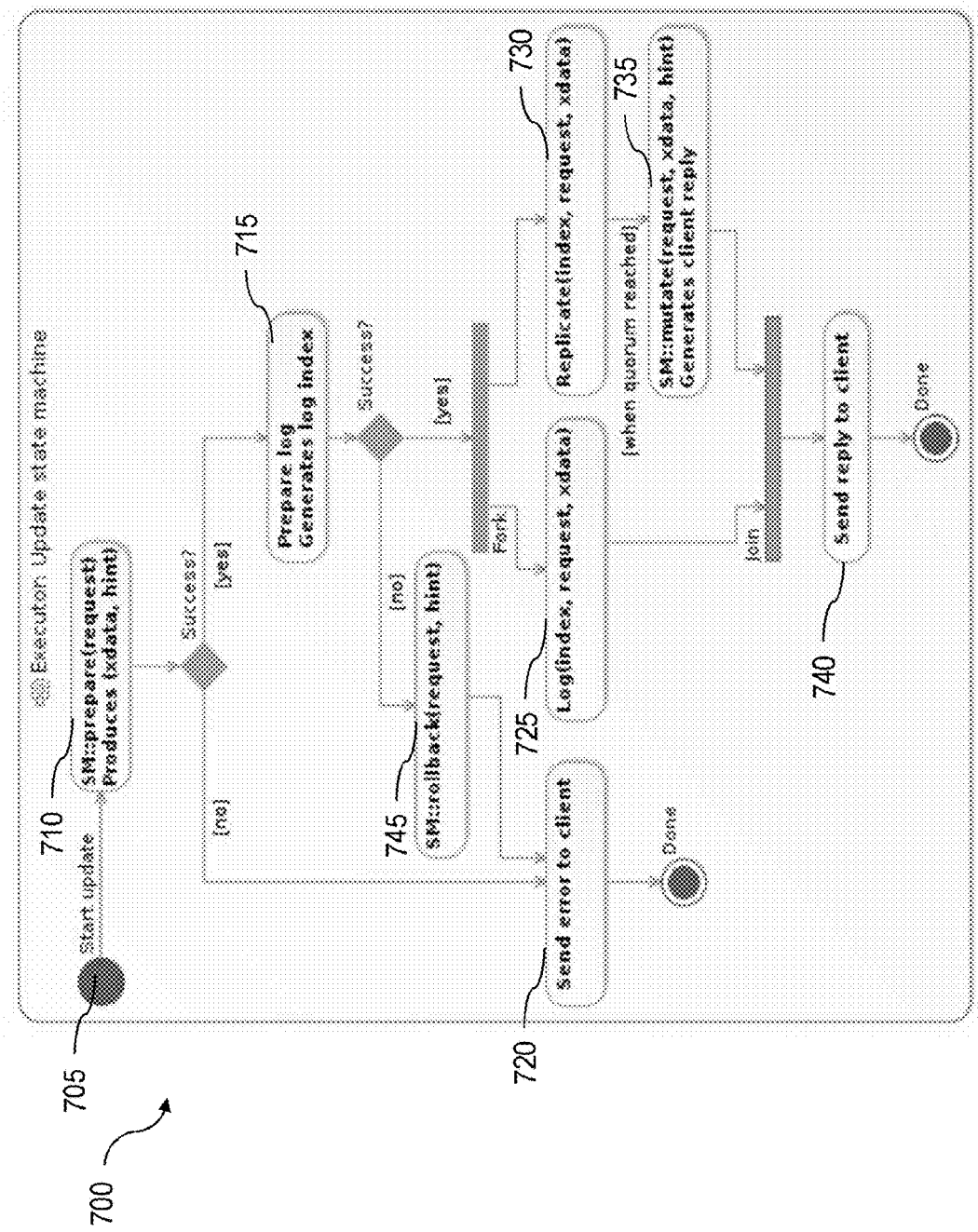
FIG. 7 shows an operations flow chart illustrating features consistent with implementations of the current subject matter.

After the state machine is prepared to accept the update, the executor prepares whatever is necessary for logging the request and extra data into a local log, calls a method (e.g. log::append( ) to actually trigger local logging and to generate a log index (logging runs in the background), and starts replication of the log record to followers using a consensus protocol. FIG. 7 depicts generation of a log index and actual logging as separate steps. However, an API consistent with implementations of the current subject matter can generate an index inside of a "log::append( )" method (e.g. a prepare step), which then runs logging in the background after the fork (e.g. a "log step").

In case preparation of logging and/or preparation of replication fails, the state machine can be informed using a "rollback( )" method or the like to roll back any temporary changes made to ensure processing of this request. Along with the rollback, an error can be sent to the client.

When the replication has succeeded, which is generally dependent on the specific consensus protocol implementation (e.g., a majority vote in PAXOS or RAFT protocols, or the like), the state machine can be updated using a "mutate( )" call, which generates a client reply. This process must succeed, as the state machine was already prepared using a "prepare( )" call. Similarly, replication will ultimately succeed as well, which is guaranteed by the consensus protocol.

The client reply can be sent to the client after both the state machine mutation and local logging are finished.

FIG. 7 shows an operations flow chart 700 illustrating a request flow consistent with implementations of the current subject matter as can be implemented by an executor of a generic state machine framework. As noted above, use of a generic state machine within the generic state machine framework decouples the specific state machine functionality from any specific consensus protocol. While this approach allows for improved flexibility in system design, use of new or different consensus protocols without requiring a full system re-design, there is a need for a rollback capability, which can restore a previous state if some operation between a "prepare" and an "update" call fails (e.g., due to out-of-memory error). Since the "prepare" might have already changed some data, the rollback needs to undo this change.

As illustrated in FIG. 7, at 705 a data update is started. At 710, the generic state machine prepares a request and produces any necessary xdata and/or hints. This can involve allocating space for storage of key value pairs, other data, etc. If the operations at 710 are successful, at 715 a local log is prepared and a log index is generated. If the operations at 710 are not successful, an error is sent at 720 to the client machine from which the update was initiated.

If the log preparation and log index generation at 715 is successful, at 725 the log record at the generated index is written locally, including the request, any xdata, etc. Additionally, as part of a cluster arrangement and to comply with a consensus protocol, the information can be replicated to other nodes at 730. When a quorum is achieved in the cluster (as defined by the consensus protocol), the generic state machine can mutate at 735 to reflect the request, any xdata, hints, etc. and to generate a client reply, which is sent to the client machine 120 at 740. Here and above, a mutate operation or request causes a state change, which is effectively the actual execution of the request, which thereby causes it to be finished or "completed" to reflect consensus (e.g. a quorum) across the cluster.

In the event that the log preparation and log index generation at 715 are not successful, the state machine can send a rollback request and any necessary hints at 745, and this then cancels any changes to the state machine done in the prepare phase and results in an error being sent to the client as at 720.

A follower node's generic state machine only needs to handle mutate requests replicated from the leader node using some consensus protocol. For example, the consensus protocol instance on the follower node can receive a replication request from the leader node. The request is logged into follower node's local log using (for example) a "log:: append( )" method. The state machine on the follower node is mutated using the state machine's "mutate( )" method with an empty hint. A reply is the sent back to the leader node to confirm the replication.

If a node in the system (re)starts, a local executor can use persistency implementation to load the last known snapshot of the state machine. Then, using the log's "process( )" method, all outstanding log records can be loaded and applied to the local state machine using the state machine's "mutate( )" method. Doing so can result in the state machine being brought up-to-date to the newest known global commit index. Next, the node can participate in the consensus protocol. If the node is a follower node, the consensus protocol will re-replicate any missing log entries by reading them using the log's "read( )" method on the current leader node.

It should be noted that whatever consensus protocol is being used can also handle error conditions, reconnects, left-behind follower nodes, leader node election, etc. as with any other consensus protocol implementation, and is therefore not described in detail here.

Figure 8:
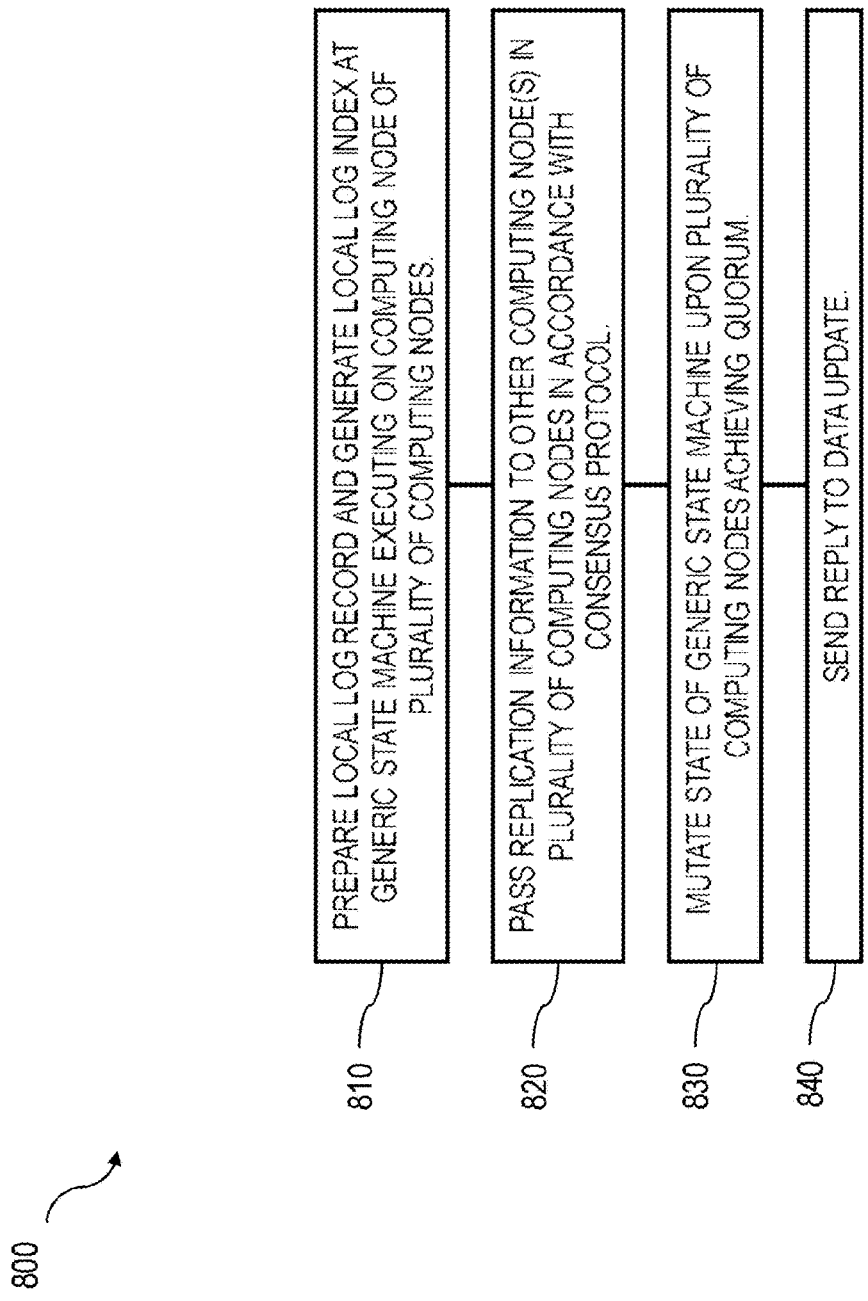
FIG. 8 shows a process flow diagram illustrating aspects of a method having one or more features consistent with implementations of the current subject matter.

FIG. 8 shows a process flow chart 800 illustrating features that can be included in a method consistent with implementations of the current subject matter. At 810, a local log record is prepared and a local log index is generated at a generic state machine executing on a computing node of a plurality of computing nodes. The preparing and generating occur in response to a data update received at the computing node. The generic state machine includes a decoupling of state handling from handling of a consensus protocol implemented by the plurality of nodes. Replication information are passed to one or more other computing nodes in the plurality of computing nodes in accordance with the consensus protocol at 820, and a state of the generic state machine is mutated at 830 upon the plurality of computing nodes achieving a quorum. A reply to the data update is sent at 840. For example, the generic state machine can reply to a client machine that provided Orr equestrian the data update to confirm that the update has been successfully committed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    preparing a local log record and generating a local log index at a generic state machine executing on a computing node of a plurality of computing nodes, the preparing and generating occurring in response to a data update received at the computing node, the generic state machine including a decoupling of state handling from handling of a consensus protocol implemented by the plurality of nodes;
    passing replication information to one or more other computing nodes in the plurality of computing nodes in accordance with the consensus protocol;
    mutating a state of the generic state machine upon the plurality of computing nodes achieving a quorum; and
    sending a reply to the data update.

2. A computer-implemented method as in claim 1, wherein the data update is received from a client machine and the reply to the data update is sent to the client machine.

3. A computer-implemented method as in claim 1, further comprising rolling back the generic state machine to a previous state if the log preparing and log index generation are not successful.

4. A computer-implemented method as in claim 1, further comprising the generic state machine preparing a request and any necessary external data and/or hints.

5. A computer-implemented method as in claim 4, wherein the preparing comprises allocating space for storage of key value pairs and/or other data.

6. A computer-implemented method as in claim 1, further comprising writing the log record at the local log index when the preparing and generating are successful.

7. A system comprising:
    computer hardware configured to perform operations comprising:
        preparing a local log record and generating a local log index at a generic state machine executing on a computing node of a plurality of computing nodes, the preparing and generating occurring in response to a data update received at the computing node, the generic state machine including a decoupling of state handling from handling of a consensus protocol implemented by the plurality of nodes;
        passing replication information to one or more other computing nodes in the plurality of computing nodes in accordance with the consensus protocol;
        mutating a state of the generic state machine upon the plurality of computing nodes achieving a quorum; and
        sending a reply to the data update.

8. A system as in claim 7, wherein the data update is received from a client machine and the reply to the data update is sent to the client machine.

9. A system as in claim 7, wherein the operations further comprise rolling back the generic state machine to a previous state if the log preparing and log index generation are not successful.

10. A system as in claim 7, wherein the operations further comprise the generic state machine preparing a request and any necessary external data and/or hints.

11. A system as in claim 10, wherein the preparing comprises allocating space for storage of key value pairs and/or other data.

12. A system as in claim 7, wherein the operations further comprise writing the log record at the local log index when the preparing and generating are successful.

13. A system as in claim 7, wherein the computer hardware comprises a programmable processor and a memory storing instructions that result in at least some of the operations when executed by the programmable processor.

14. A computer program product comprising a non-transitory computer-readable medium storing instructions that, when executed by at least one programmable processor result in operations comprising:
    preparing a local log record and generating a local log index at a generic state machine executing on a computing node of a plurality of computing nodes, the preparing and generating occurring in response to a data update received at the computing node, the generic state machine including a decoupling of state handling from handling of a consensus protocol implemented by the plurality of nodes;
    passing replication information to one or more other computing nodes in the plurality of computing nodes in accordance with the consensus protocol;

mutating a state of the generic state machine upon the plurality of computing nodes achieving a quorum; and sending a reply to the data update.

15. A computer program product as in claim 14, wherein the data update is received from a client machine and the reply to the data update is sent to the client machine.

16. A computer program product as in claim 14, wherein the operations further comprise rolling back the generic state machine to a previous state if the log preparing and log index generation are not successful.

17. A computer program product as in claim 14, wherein the operations further comprise the generic state machine preparing a request and any necessary external data and/or hints.

18. A computer program product as in claim 17, wherein the preparing comprises allocating space for storage of key value pairs and/or other data.

19. A computer program product as in claim 14, wherein the operations further comprise writing the log record at the local log index when the preparing and generating are successful.

\* \* \* \* \*